United States Patent
Tsukahara et al.

(10) Patent No.: US 10,647,452 B2
(45) Date of Patent: May 12, 2020

(54) ABLATOR, RE-ENTRY VEHICLE AND METHOD OF MANUFACTURING THEM

(71) Applicants: MITSUBISHI HEAVY INDUSTRIES, LTD., Tokyo (JP); LIGNYTE CO., LTD., Osaka (JP)

(72) Inventors: Aiichiro Tsukahara, Tokyo (JP); Fumihito Takeda, Tokyo (JP); Junko Watanabe, Tokyo (JP); Isamu Ide, Osaka (JP); Shinsuke Takeda, Osaka (JP)

(73) Assignees: MITSUBISHI HEAVY INDUSTRIES, LTD., Tokyo (JP); LIGNYTE CO., LTD., Osaka (JP)

( * ) Notice: Subject to any disclaimer, the term of this patent is extended or adjusted under 35 U.S.C. 154(b) by 763 days.

(21) Appl. No.: 15/302,292

(22) PCT Filed: Apr. 9, 2015

(86) PCT No.: PCT/JP2015/061153
§ 371 (c)(1),
(2) Date: Oct. 6, 2016

(87) PCT Pub. No.: WO2015/156368
PCT Pub. Date: Oct. 15, 2015

(65) Prior Publication Data
US 2017/0029140 A1    Feb. 2, 2017

(30) Foreign Application Priority Data
Apr. 10, 2014    (JP) ................... 2014-081352

(51) Int. Cl.
*B64G 1/58*    (2006.01)
*B29C 70/06*    (2006.01)
(Continued)

(52) U.S. Cl.
CPC ................ *B64G 1/58* (2013.01); *B29C 35/02* (2013.01); *B29C 65/48* (2013.01); *B29C 69/001* (2013.01);
(Continued)

(58) Field of Classification Search
CPC ....... B29C 35/02; B29C 65/48; B29C 69/001; B29C 70/025; B29C 70/06; B64G 1/58;
(Continued)

(56) References Cited

U.S. PATENT DOCUMENTS 3,520,027 A * 7/1970 Bird ..................... B29C 45/0005
                                                                              425/131.1
3,962,491 A * 6/1976 Sato ........................ B01J 2/006
                                                                                427/195
(Continued)

FOREIGN PATENT DOCUMENTS

| JP | 9-239847 | 9/1997 |
| JP | 9-316217 | 12/1997 |

(Continued)

OTHER PUBLICATIONS

International Search Report dated Jun. 23, 2015 in corresponding International Application No. PCT/JP2015/061153.
(Continued)

*Primary Examiner* — Medhat Badawi
(74) *Attorney, Agent, or Firm* — Wenderoth, Lind & Ponack, L.L.P.

(57) ABSTRACT

An ablator is provided to improve a fuselage protection performance while having flexibility. The ablator includes a base material formed from fiber, granular resin, and binder resin impregnated in the fiber to couple the granular resin and the base material.

9 Claims, 3 Drawing Sheets

(51) Int. Cl.
*B29C 70/02* (2006.01)
*B64G 1/62* (2006.01)
*B29C 35/02* (2006.01)
*B29C 65/48* (2006.01)
*B29C 69/00* (2006.01)
*B29K 105/06* (2006.01)
*B29L 31/30* (2006.01)

(52) U.S. Cl.
CPC ............ *B29C 70/025* (2013.01); *B29C 70/06* (2013.01); *B64G 1/62* (2013.01); *B29K 2105/06* (2013.01); *B29L 2031/3097* (2013.01)

(58) Field of Classification Search
CPC .......... B64G 1/62; B29K 2105/06; C08J 5/00; C08J 3/00; C08J 9/00; B32B 5/00
See application file for complete search history.

(56) References Cited

U.S. PATENT DOCUMENTS

| | | | | |
|---|---|---|---|---|
| 4,151,800 | A * | 5/1979 | Dotts | B64G 1/58 244/121 |
| 4,255,483 | A * | 3/1981 | Byrd | D01F 11/123 442/136 |
| 4,364,991 | A * | 12/1982 | Byrd | C08K 5/49 427/385.5 |
| 4,804,571 | A * | 2/1989 | Jouffreau | B64G 1/58 244/117 A |
| 6,136,418 | A * | 10/2000 | Martin | B32B 7/12 428/195.1 |
| 6,264,144 | B1 * | 7/2001 | Thornton | B64G 1/58 244/113 |
| 6,280,667 | B1 * | 8/2001 | Koenig | B27N 3/002 264/68 |
| 7,219,859 | B2 * | 5/2007 | Johnson | B64G 1/24 244/158.9 |
| 7,510,754 | B2 * | 3/2009 | DiChiara, Jr. | C04B 35/18 156/89.11 |
| 7,931,962 | B1 * | 4/2011 | Willcockson | B64G 1/58 244/159.1 |
| 9,475,261 | B2 * | 10/2016 | Pinney | B32B 7/08 |
| 9,475,593 | B2 * | 10/2016 | Pinney | B64G 1/58 |
| 9,522,747 | B2 * | 12/2016 | Coleman | B64D 17/80 |
| 9,592,923 | B1 * | 3/2017 | Stackpoole | B64G 1/58 |
| 9,656,769 | B2 * | 5/2017 | Mazed | D03D 25/005 |
| 2004/0258732 | A1 * | 12/2004 | Shikinami | A61L 27/446 424/426 |
| 2006/0142451 | A1 * | 6/2006 | Yushina | B29C 65/1635 524/358 |
| 2009/0258958 | A1 * | 10/2009 | Ford | A61L 27/16 521/56 |
| 2017/0029140 | A1 * | 2/2017 | Tsukahara | B29C 70/06 |

FOREIGN PATENT DOCUMENTS

| | | |
|---|---|---|
| JP | 2001-247100 | 9/2001 |
| JP | 2013-28166 | 2/2013 |
| JP | 2013-121786 | 6/2013 |

OTHER PUBLICATIONS

Miread Stackpoole et al., "Development of Low Density Flexible Carbon Phenolic Ablators" NSMMS—2011, Jun. 27-30, 2011, Madison, WI, http://ntrs.nasa.gov/archive/nasa/casi.ntrs.nasa.gov/20110015026_2011015871.pdf.

International Preliminary Report on Patentability dated Oct. 12, 2016 in corresponding International Application No. PCT/JP2015/061153.

\* cited by examiner

Fig. 2

| | EXAMPLE 1 | EXAMPLE 2 | EXAMPLE 3 | COMPARISON EXAMPLE |
|---|---|---|---|---|
| BASE MATERIAL | CF FELT | CF FELT | CF FELT | CF FELT |
| CONTENT OF RESIN IN MATERIAL SOLUTION | RESOL 1.0% SPHERICAL RESIN 1.0% | RESOL 2.0% SPHERICAL RESIN 5.0% | RESOL 2.5% SPHERICAL RESIN 2.5% | RESOL 5.0% — |
| CHANGE IN MASS | 1.75g→2.05g | 3.32g→5.09g | 1.33g→2.07g | 1.17g→1.55g |
| RATIO OF RESIN MASS TO BASE MATERIAL MASS | 17% | 53% | 56% | 32% |
| FLEXIBILITY | YES | YES | YES | NO |

| ITEM | RESULT | UNIT |
|---|---|---|
| CF BASE MATERIAL | 3.32 | g |
| MASS BEFORE TEST | 5.09 | g |
| MASS AFTER TEST | 3.59 | g |
| MASS REDUCTION | 1.50 | g |
| PLATE THICKNESS BEFORE THE TEST | 19.2 | mm |
| PLATE THICKNESS AFTER THE TEST | 16.0 | mm |
| PLATE THICKNESS REDUCTION QUANTITY | 3.2 | mm |
| SURFACE MAX. TEMPERATURE | 1817 | °C |

ABLATOR, RE-ENTRY VEHICLE AND METHOD OF MANUFACTURING THEM

TECHNICAL FIELD

The present invention relates to an ablator, a re-entry vehicle and a method of manufacturing them.

BACKGROUND ART

An ablator is attached to a re-entry vehicle which carries out a reentry from the space to the atmosphere (e.g. a re-entry recovery capsule and a space go and return vehicle) to protect a fuselage of the vehicle from the aerodynamic heating upon re-entering. The ablator is a structure that blocks off the transfer of heat to the fuselage main unit by pyrolyzation, and generally, is formed of resin or a composite material of resin and inorganic substance (fiber). For example, Patent Literature 1 (JP 2013-121786A) discloses an ablator that contains an inner layer ablator composed of first fiber impregnated with first resin and an outer layer ablator composed of the first fiber impregnated with the first resin and being of a lower density than the inner layer ablator. Also, Patent Literature 2 (JP H09-316217A) discloses an ablator impregnated in carbon fiber/carbon composite material with phenol resin.

Also, Non-Patent Literature 1 (Miread Stackpoole et al., "Development of Low Density Flexible Carbon Phenolic Ablators", NSMMS-2011, Jun. 27-30, 2011, Madison, Wis.) discloses an ablator having flexibility. The general ablator manufactured by curing resin does not have the flexibility. Accordingly, the ablator needs to be shaped to fit to the fuselage shape by using a jig (e.g. a mold), or to carry out cut processing and polish processing to fit to the fuselage shape after the curing. However, such a technique requires a jig cost and a processing cost and there is a problem with respect to the cost. On the other hand, the ablator having the flexibility is possible to transform the ablator according to the fuselage shape when attaching to the fuselage. Accordingly, the jig and the processing to fit to the fuselage shape are unnecessary, so that it is effective in the reduction of cost. The ablator disclosed in Non-Patent Literature 1 is composed of carbon fiber (fiber form and felt) and phenol resin impregnated in the fiber. Note that the ablator having the flexibility is also disclosed in Patent Literature 3 (U.S. Pat. No. 7,931,962).

CITATION LIST

[Patent Literature 1] JP 2013-121786A
[Patent Literature 2] JP H09-316217A
[Patent literature 3] U.S. Pat. No. 7,931,962
[Non-patent literature 1] Miread Stackpoole et al., "Development of Low Density Flexible Carbon Phenolic Ablators", NSMMS-2011, Jun. 27-30 2011, Madison, Wis. http://ntrs.nasa.gov/archive/nasa/casi.ntrs.nasa.gov/20110015026_2011015871.pdf In a technique disclosed in Non-Patent Literature 1, it becomes necessary to reduce the content of phenol resin to a relatively small quantity in order to give the necessary flexibility to the ablator. On the other hand, because the ablator protects the fuselage through pyrolyzation of the ablator, the reduction of the content of the phenol resin causes the reduction in the performance to protect the fuselage from the aerodynamic heating.

SUMMARY OF THE INVENTION

Therefore, an object of the present invention is to provide an ablator to improve the fuselage protection performance while having the flexibility.

According to an aspect of the present invention, the ablator contains base material formed of fiber, granular resin, and binder resin that is impregnated in the base material to couple the granular resin and the base material. A quantity of binder resin contained in the ablator is adjusted for the ablator to have flexibility.

It is desirable that spherical resin is used as the granular resin. Also, it is desirable that each of the granular resin and the binder resin is produced from any of phenol resin, fran resin, and mixture resin of them. Also, it is desirable that the base material is produced from carbon fiber.

According to another aspect of the present invention, a re-entry vehicle is provided with the above-mentioned ablator and a fuselage main unit to which the ablator is installed.

According to a still another aspect of the present invention, a method of manufacturing the ablator includes impregnating the base material with a material solution that contains uncured resin and cured granular resin, and curing the uncured resin after impregnating the base material with the material solution.

According to another aspect of the present invention, a method of manufacturing a re-entry vehicle includes manufacturing the ablator; and installing the ablator on the fuselage main unit. The method of manufacturing the ablator includes impregnating the base material with the material solution which contains uncured resin and cured granular resin; and curing the uncured resin after the impregnating the base material with the material solution.

According to the present invention, the ablator is provided to improve the fuselage protection performance while having the flexibility.

BRIEF DESCRIPTION OF THE DRAWINGS

FIG. 2 is a table indicating a production condition of the ablator according to the embodiment of the present invention and a comparison example.

DESCRIPTION OF THE EMBODIMENTS

Figure 1:
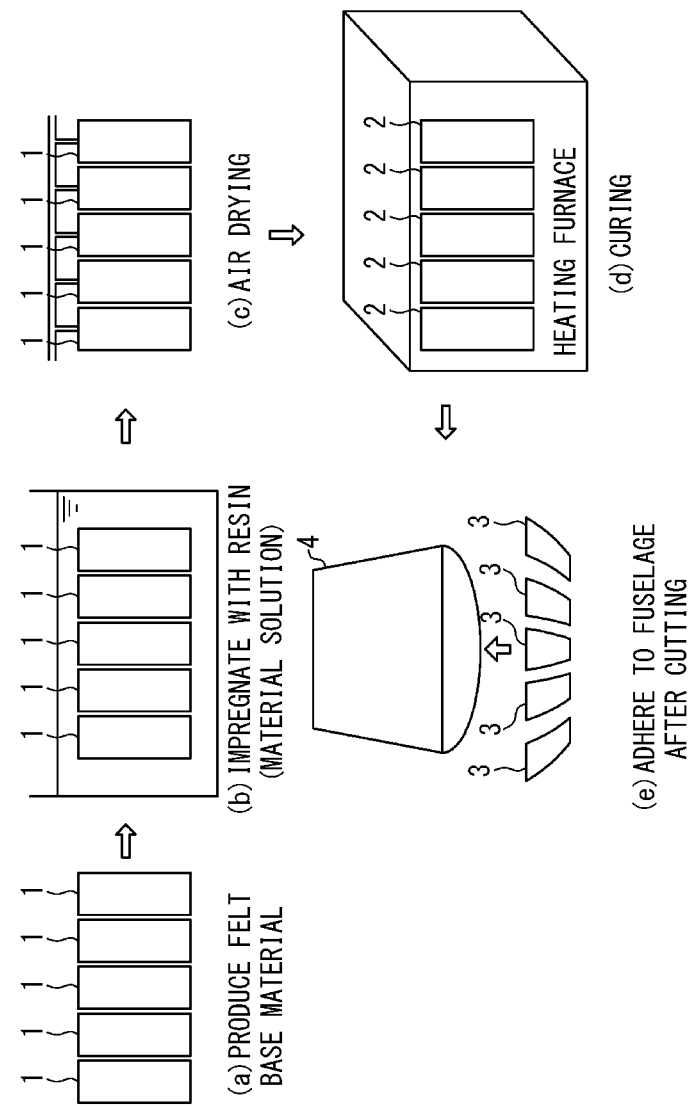
FIG. 1 is a conceptual diagram showing a method of manufacturing an ablator and a re-entry vehicle according to an embodiment of the present invention.

Hereinafter, an ablator and a method of manufacturing the ablator according to an embodiment the present invention will be described with reference to the attached drawings.

According to the embodiment of the present invention, the ablator contains a base material formed from fiber, granular resin, and binder resin impregnating in the fiber to couple and combine the granular resin and the base material.

As the fiber which configures the base material, for example, any of carbon fiber (CF), glass fiber, silica fiber, basalt fiber, PBO (Poly-p-phenylene benzoxazole) fiber, alumina fiber, and tyranno fiber (registered trademark of Ube Industries, Ltd.) can be used. From the viewpoint of the improvement of heat resistance of a re-entry vehicle, it is desirable to use the carbon fiber as the fiber configuring the base material. In the embodiment, as the base material, carbon fiber felt can be used in which non-woven cloth of the carbon fiber is laminated for two or more layers and the laminated non-woven is confounded with a needle punch.

Also, as the granular resin, it is desirable to use spherical resin (resin of spherical particles). In other words, it is desirable that the shape of each particle of the granular resign is spherical. By using the spherical resin as the granular resin, it becomes easy for the granular resin to prevail in the whole fiber of the base material. In the embodiment, for example, the spherical resin of about 10-μm diameter can be used as the granular resin.

As the materials of the granular resin and the binder resin, for example, any of phenol resin, fran resin, mixture resin of the phenol resin and the fran resin, and epoxy resin can be used. From the viewpoint of the improvement of heat resistance of the re-entry vehicle, any of the phenol resin, the fran resin, and the mixture resin of the phenol resin and the fran resin is desirable as the material of the granular resin or the binder resin. The phenol resin and the fran resin are generally superior in the heat resistance. By using any of the phenol resin, the fran resin and the mixture resin of them for the granular resin and the binder resin, the fuselage protection performance of the ablator can be improved.

According to the structure of the ablator in the present embodiment, it is possible to improve the fuselage protection performance while the ablator has the flexibility, by adjusting or controlling the contents of the granular resin and the binder resin appropriately. When the content of the binder resin is high, the coupling between the fibers becomes firm so that the ablator becomes a rigid body (that is, the flexibility is lost). On the contrary, when the content of the binder resin is low, the coupling between the fibers becomes weak so that the ablator can have the flexibility. In the ablator of the present embodiment, by adjusting the content of the binder resin, the coupling between the fibers by the binder resin becomes weak so that the flexibility is given to the ablator.

On the other hand, the heat resistance of the ablator, i.e. the fuselage protection performance depends on the content of the granular resin in addition to the content of the binder resin. Note that the granular resin does not contribute to the coupling between the fibers too much. Even if the ablator contains the granular resin, the ablator does not lose the flexibility. In other words, even if the content of the binder resin is low, the heat resistance of the ablator, i.e. the fuselage protection performance can be improved by adding the granular resin. In this way, according to the configuration of the ablator in the present embodiment, the content of the binder resin is reduced in a range that the ablator has the flexibility and the fuselage protection performance can be sufficiently ensured, by adding the granular resin of an appropriate quantity to the ablator.

FIG. 1 is a conceptual diagram showing the method of manufacturing the ablator and the re-entry vehicle in the embodiment. As shown in (a) of FIG. 1, first, felt base material 1 is produced. When the ablator is configured from a plurality of ablator members, a pattern is made according to the shape of a fuselage main unit of the re-entry vehicle, and the felt base material 1 corresponding to the plurality of ablator members according to the pattern is produced. As mentioned above, the felt base material 1 may be formed from carbon fiber or glass fiber.

Next, as shown in (b) of FIG. 1, the impregnation of the resin into the felt base material 1 is carried out. More specifically, material solution is prepared in which uncured resin is dissolved and granular resin (spherical resin) is dispersed. The felt base material 1 is impregnated with the material solution. Thus, the felt base material 1 is impregnated with the material solution. As mentioned later, the uncured resin which is contained in the material solution is cured in the following process to function as the binder resin which is contained in the ablator. On the other hand, as the granular resin (the spherical resin) which is contained in the material solution, the cured resin is used. This means that the granular resin does not have a function to couple the fibers of the felt base material 1 to each other directly.

In the present embodiment, resol is used as the uncured resin. This means that the phenol resin is used as the binder resin which is finally contained in the ablator. On the other hand, as the granular resin, the already cured phenol resin or fran resin is used. Also, as the solvent in which the uncured resin is dissolved, methanol is used. That is, in the present embodiment, the solution in which the granular resin (the spherical resin) formed of the cured phenol resin or fran resin is dispersed in the resol varnish that the resol has been dissolved in methanol, is used as the material solution. As the granular resin, for example, the spherical resin with 10-μm diameter is used.

The content of the binder resin which is contained in the ablator is adjustable based on the content of the uncured resin which is contained in material solution (the content of the resol which is contained in the material solution in the present embodiment). The content of the uncured resin which is contained in the material solution is adjusted such that the finally made ablator has the flexibility.

Next, as shown in (c) of FIG. 1, the solvent of the material solution that has been impregnated in the felt base material 1 is evaporated by air-drying. In the present embodiment that solution in which the granular resin formed from the cured phenol resin or fran resin has been dispersed in the resol varnish is used as the material solution, the methanol of the solvent which is contained in the resol varnish is evaporated by the air-drying.

Next, as shown in (d) of FIG. 1, the uncured resin that has been impregnated in the felt base material 1 is cured. In the present embodiment, the resol which has been impregnated in the felt base material 1 is cured by heating a heating furnace. Thus, the ablator members 2 which are used to manufacture a part which configures the ablator are completed. In the present embodiment, an assembly in which the parts produced from the ablator members 2 are combined is used as the ablator.

Moreover, as shown in (e) of FIG. 1, the ablator is installed to the fuselage main unit 4. In detail, the ablator members 2 are cut out to produce the parts 3 which configure the ablator, and the part 3 is adhered to the fuselage main unit 4 with an adhesive material. In the present embodiment, because the ablator member 2 has the flexibility, each part 3 can be bent to fit to the shape of the fuselage main unit 4 in case of adhesion of the part 3 which has been produced from the ablator member 2. This means that the ablator can be joined or installed to the fuselage main unit 4 with little labor. When the ablator not having the flexibility is joined to the fuselage main unit, the ablator must be shaped to fit to the shape of the fuselage main unit or cut. On the other hand, in the ablator of the present embodiment which has the flexibility, it is easy to make the ablator fit the shape of the fuselage main unit 4 and, therefore, the cost and work to join the ablator to the fuselage main unit 4 can be reduced.

Below, the embodiment of the present invention will be described.

Embodiment

A sample was made to have confirmed the ablator of the present invention. As the base material, a carbon fiber felt made to subject to needle punch was used. Also, phenol resin was used as the spherical resin and the binder resin.

FIG. 2 is a table showing a production condition of the sample. Samples of embodiments 1-3 and a sample of comparison example 1 were produced. As the base material, the carbon fiber felt was used in all the samples.

As the material solution used for producing the samples, two kinds of material solution were prepared. As the material solution which is used for producing the samples of the embodiments 1-3, the solution is prepared in which the granular resin (the spherical resin) formed of cured phenol resin is dispersed in the resol varnish in which the resol was dissolved in methanol. As the granular resin, the spherical resin of about 10 μm in diameter was used. In the embodiment 1, the content of the resol and the content of the granular resin in the material solution were 1 mass % in either case. In the embodiment 2, the content of the resol was 2.0 mass % in the material solution and the content of the granular resin was 5.0 mass %. Also, in the embodiment 3, the content of the resol and the content of the granular resin in the material solution was 2.5 mass % in either case.

On the other hand, as the material solution which is used for producing the sample of the comparison example 1, the resol varnish was used in which the resol was dissolved in methanol. Note that any granular resin is not contained in the material solution which is used for producing the ablator of the comparison example. In the comparison example, the content of the resol in the material solution was 5.0 mass %.

The base material is impregnated in each of the above-mentioned material solutions. Moreover, the solvent is evaporated by air-drying from the material solution impregnated in the base material. Moreover, the resol was cured by heating and a sample was produced.

The column of "mass change" in the table of FIG. 2 indicates the mass of original base material and the mass of the sample which was finally produced. For example, in the embodiment 1, the mass of original base material is 1.75 g and the mass of sample which was finally produced is 2.05 g. The same results as the above case are obtained in the embodiments 2 and 3 and the comparison example. The difference between the mass of ablator finally produced and the mass of original base material is a mass of resin finally contained in the ablator.

The column of the "ratio of mass of resin to mass of base material" in the table of FIG. 2 shows a ratio of the mass of resin finally contained in the ablator to the mass of base material. Here, note that the mass of resin finally contained in the ablator is equal to a total of the mass of binder resin and the mass of granular resin, with respect to the samples of the embodiments 1-3. On the other hand, because the granular resin is not contained in the sample of the comparison example, the mass of resin finally contained in the ablator is equal to the mass of binder resin.

In this case, as mentioned above, because the ratio of the content of resol in the material solution and the content of granular resin is 1:1 in the embodiments 1-3, a half of the resin finally contained in the ablator of the embodiments 1-3 is the binder resin, and the remaining half is estimated to be the granular resin.

In the comparison example 1, a rate of the mass of resin to the mass of base material (that is, a total of the mass of binder resin to the mass of base material) was 32%, but the ablator having no flexibility was produced.

On the other hand, in the embodiment 1, the rate of the mass of resin to the mass of base material (that is, a ratio of a total of the mass of spherical resin and the mass of binder resin to the mass of base material) is 17%, and the ablator having the flexibility was produced.

In the embodiments 2 and 3, the rates of the mass of resin to the mass of base material are 53% and 56%, respectively. The total content of resin contained in the sample is more than in the comparison example 1 but the samples of the embodiments 2 and 3 showed the flexibility. This means that the ablator of the present embodiment which contains the granular resin (the spherical resin) has the flexibility and moreover can improve the fuselage protection performance.

Figures 3, 4:
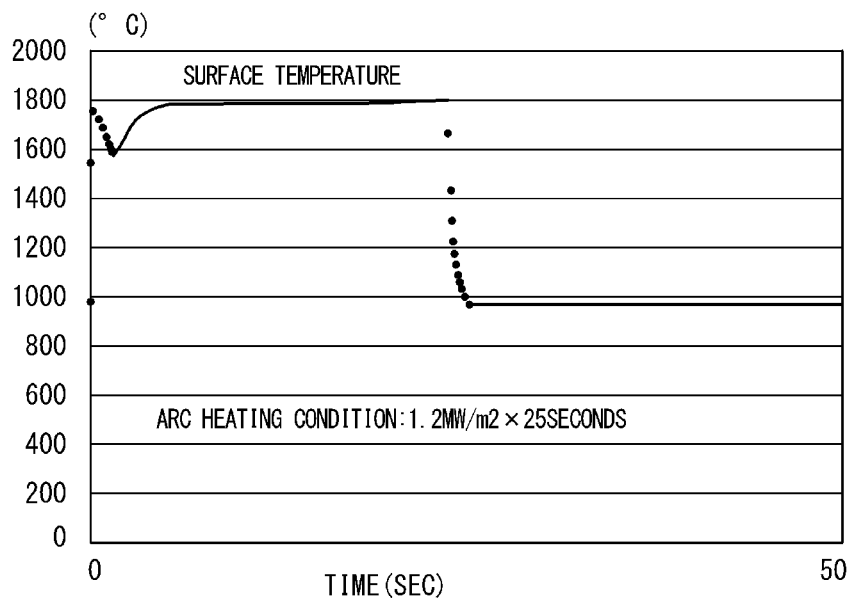
FIG. 3 is a graph showing the result of an arc heating test according to the embodiment of the present invention.
FIG. 4 is a table indicating the result of the arc heating test according to the embodiment of the present invention.

FIG. 3 and FIG. 4 show the results when an arc heating test is carried out to the sample of the embodiment 2. The arc heating test is a method used to test the heat resistance of the ablator to the aerodynamic heating at the time of the re-entry, and it is a technique of heating the sample by the arc heating and of testing the heat resistance of the sample. As the condition of the arc heating test, the arc discharge was carried out in the power density of 1.2 MW/m$^2$ to carry out the arc heating for 25 seconds.

FIG. 3 is a graph showing the change of the surface temperature of the sample for 50 seconds in the arc heating test. In the first 25 seconds, the arc heating is carried out and in the second 25 seconds, the arc heating has been stopped. By the arc heating, the surface temperature rose and the maximum temperature of the surface reached 1817° C. After that, after the arc heating is stopped, the surface temperature decreases and became less than 1000° C.

As shown in FIG. 4, before the arc heating test, in the sample of the embodiment 2, the mass was 5.09 g and the board thickness was 19.2 mm. After the arc heating test, the mass of the sample decreased to 3.59 g and the board thickness decreased to 16.0 mm. The decrease of the mass was 1.50 g and the decrease of the board thickness was 3.2 mm. This result shows that the sample of the embodiment 2 has the heat resistance required for the ablator.

EXPLANATION OF THE CODE

1: felt base material
2: ablator member
3: part
4: fuselage main unit

The invention claimed is:

1. An ablator comprising:
abase material formed from fiber;
granular resin; and
binder resin impregnated in the base material to couple the granular resin and the base material,
wherein a content of the hinder resin contained in the ablator is adjusted so that the ablator has flexibility.

2. The ablator according to claim 1, wherein the granular resin is spherical.

3. The ablator according to claim 1, wherein the granular resin or the binder resin is formed from any of phenol resin, fran resin, and mixture resin of the phenol resin and the fran resin.

4. The ablator according to claim 1, wherein the base material is formed from any of carbon fiber, glass fiber, silica fiber, basalt fiber, poly-p-phenylene benzoxazole fiber, alumina fiber and tyranno fiber.

5. A re-entry, vehicle comprising:
an ablator; and
a fuselage main unit on which the ablator is installed,
wherein the ablator comprises:
a base material formed from fiber;
granular resin; and hinder resin impregnated in the fiber to couple, the granular resin and the base material, wherein a content of the binder resin contained in the ablator is adjusted so that the ablator has flexibility.

6. A method, of manufacturing an ablator, the method comprising:

preparing material solution;

impregnating a base material formed from fiber with the material solution which contains uncured hinder resin and clued granular resin; and curing the uncured binder resin after the impregnating with the material solution, wherein a content of the uncured binder resin contained in the material solution is adjusted so that the ablator has flexibility after the curing.

7. The method according to claim 6, wherein the granular resin is spherical.

8. The method according to claim 6, wherein each of the granular resin and the binder resin is formed from any of phenol resin, fran resin, and mixture resin of the phenol resin and the fran resin.

9. A method of manufacturing a re-entry vehicle, the method comprising:

manufacturing an ablator; and installing the ablator on a fuselage main unit, wherein the manufacturing the ablator comprises:

preparing material solution;

impregnating a base material formed from fiber with the material solution which contains uncured hinder resin and cured granular resin; and curing the uncured binder resin after the impregnating with the material solution, wherein a content of the uncured binder resin contained in the ablator is adjusted so that the ablator has flexibility after the curing.

\* \* \* \* \*